United States Patent
Jakusovszky et al.

(10) Patent No.: US 9,420,407 B2
(45) Date of Patent: Aug. 16, 2016

(54) METHOD AND SYSTEM FOR BIDIRECTIONAL COMMUNICATIONS VIA A BLUETOOTH LOW ENERGY ADVERTISE LINK

(71) Applicant: EM MICROELECTRONIC-MARIN S.A., Marin (CH)

(72) Inventors: Mark Jakusovszky, Colorado Springs, CO (US); Evan Lojewski, Woodland Park, CO (US)

(73) Assignee: EM MICROELECTRONIC MARIN S.A., Marin (CH)

( * ) Notice: Subject to any disclaimer, the term of this patent is extended or adjusted under 35 U.S.C. 154(b) by 127 days.

(21) Appl. No.: 14/298,453

(22) Filed: Jun. 6, 2014

(65) Prior Publication Data
US 2015/0358759 A1 Dec. 10, 2015

(51) Int. Cl.
*H04W 4/00* (2009.01)
*H04W 48/10* (2009.01)
*H04W 8/00* (2009.01)
*H04W 76/02* (2009.01)

(52) U.S. Cl.
CPC .............. *H04W 4/008* (2013.01); *H04W 8/005* (2013.01); *H04W 48/10* (2013.01); *H04W 76/023* (2013.01)

(58) Field of Classification Search
CPC .......... H04M 2207/18; H04M 3/4878; H04M 1/7253; H04M 2250/02; H04N 21/41407; H04N 21/812; H04W 8/005; H04W 4/008; H04W 74/06; H04W 76/028; H04W 76/048
USPC ................. 455/41.1, 41.2; 370/216, 312, 328
See application file for complete search history.

(56) References Cited

U.S. PATENT DOCUMENTS

| | | | |
|---|---|---|---|
| 2007/0141985 A1 | 6/2007 | Parkkinen et al. | |
| 2012/0052802 A1 | 3/2012 | Kasslin et al. | |
| 2012/0196534 A1* | 8/2012 | Kasslin | H04W 76/002 455/41.2 |
| 2014/0169599 A1* | 6/2014 | Solum | H04R 25/554 381/315 |

(Continued)

FOREIGN PATENT DOCUMENTS

| | | |
|---|---|---|
| EP | 2605552 A2 | 6/2013 |
| WO | 2013149380 A1 | 10/2013 |
| WO | 2013177792 A1 | 12/2013 |

OTHER PUBLICATIONS

European Search Report dated Oct. 15, 2015 issued by the European Patent Office in counterpart application No. 15164103.

*Primary Examiner* — Edward Urban
*Assistant Examiner* — Max Mathew
(74) *Attorney, Agent, or Firm* — Sughrue Mion, PLLC (57) ABSTRACT

The present invention relates to a method, to a computer program and to a system to establish wireless communication between at least two Bluetooth Low Energy (BLE) devices the method comprising the steps of:
  switching a first BLE device (20) into a scanning mode (SM),
  switching a second BLE device (30) into an advertising mode (AM), and broadcasting a first advertising packet (31) from the second BLE device,
  switching the second BLE device (30) into the scanning mode (SM),
  receiving the first advertising packet (31) by first BLE device (20), and
  switching the first BLE device (20) into the advertising mode (AM), and broadcasting a second advertising packet (21) from the first BLE device (30).

12 Claims, 4 Drawing Sheets (56) References Cited

U.S. PATENT DOCUMENTS

2015/0109897 A1* 4/2015 Lee .................. H04W 48/10 370/216
2015/0154543 A1* 6/2015 Skaaksrud ............ H04W 12/06 705/333
2015/0201455 A1* 7/2015 Redding ............. H04W 76/048 455/41.2

* cited by examiner

METHOD AND SYSTEM FOR BIDIRECTIONAL COMMUNICATIONS VIA A BLUETOOTH LOW ENERGY ADVERTISE LINK

TECHNICAL FIELD

The present invention relates to the field of wireless communication between wireless communication devices. In particular the invention relates to a method, to a system as well as to a computer program for Bluetooth Low Energy communication and/or data transmission.

BACKGROUND OF THE INVENTION

Bluetooth Low Energy (BLE) is a wireless personal area network technology designed and marketed by the Bluetooth Special Interest Group aimed at novel applications, in particular for the fields of healthcare, fitness, security and home entertainment. Compared to 'classic' or 'conventional' Bluetooth' BLE is intended to provide considerably reduced power consumption and cost while maintaining a similar communication range.

With classic BLE systems at least a pair of BLE devices, one of which denoted as a peripheral and the other one of which denoted as a hub, are able to establish a communication link. Typically, the peripheral device advertises or broadcasts while the hub scans. Once the hub identifies a suitable peripheral device it requests a connection, pairs with the peripheral device and takes control over the peripheral device. At that time, the peripheral device stops advertising and communication becomes 'closed' so that communication is solely established between the hub and the peripheral device. For implementation of such a standard method, a complete BLE firmware stack and hardware must be implemented for both BLE devices. In addition, once the communication between the pair of BLE devices has been established the communication takes place point-to-point. It is only visible to the hub and to the connected peripheral device.

Bluetooth Low Energy communication may also be established by a different mode, namely by non-connectable undirected advertising, in short 'advertising mode'. There, the peripheral device only and exclusively advertises and is unwilling and/or unable to pair or to connect with the hub device. A drawback of this communication protocol is that there is no way for the peripheral device to get knowledge whether a broadcast packet or message has been correctly received by a hub device. Moreover, the peripheral device does not get any information as to which of a multiplicity of available hub devices actually received or processed the previously broadcast packet or message. Another drawback is that the peripheral device is unable to get and to process any feedback or instructions by way of which its further broadcasting behavior could be modified. In addition, the peripheral is unable to receive programming or re-programming instructions wirelessly, e.g. at power up or in situ. It may never act as a hub or as a receiver.

SUMMARY OF THE INVENTION

It is therefore an object of the present invention to provide an improved method of wireless communication between at least two Bluetooth Low Energy devices by way of which a bi-directional communication can be established without the need of implementing a complete BLE stack. The invention further aims to provide a respective computer program and a wireless communication system that is implementable on the basis of low cost and space saving hardware components.

According to a first aspect the invention relates to a method of wireless communication between at least two Bluetooth Low Energy (BLE) devices. The method comprises the steps of switching a first BLE device into a scanning mode and switching a second BLE device into an advertising mode. When in advertising mode, the second BLE device is broadcasting a first advertising packet, typically in a non-connectable undirected advertising mode. In this initial or default configuration one of the at least two BLE devices acts as a hub or receiver while the other one of the BLE devices acts and behaves like a peripheral device as they are commonly known and implemented for the non-connectable undirected advertising mode.

After the second BLE device has broadcast the first advertising packet the second BLE device is switched into the scanning mode. The first BLE device, which is still in scanning mode, just receives the first advertising packet that was broadcast from the second BLE device. After the first BLE device has received the first advertising packet also the first BLE device switches from the scanning mode into the advertising mode. In this way first and second BLE devices swap roles. After such role swapping it is then the first BLE device that broadcasts a second advertising packet, which is receivable and which is actually received by the second BLE device.

Typically, first and second BLE devices alternately swap roles and their broadcasting and receiving function between the scanning mode and the advertising mode. The two devices remain substantially disconnected and may operate according to the non-connectable undirected advertising protocol with the exception that first and second BLE devices frequently swap roles. In this way, a peripheral device may receive a feedback from a hub, that for instance a broadcast packet has been received. Moreover, with the role swapping of first and second BLE devices a wireless programming or re-programming as well as various modifications of at least one BLE device can be implemented in response to such a role swapping and feedback of communication. From a hardware point of view comparatively low cost and space saving BLE devices and components can be used without the need of implementing a complete BLE stack.

According to an embodiment, at least one of the first and second BLE devices switches from the scanning mode into the advertising mode in response to receive an advertising packet. Hence, switching from scanning mode into advertising mode can be triggered by receiving and/or processing of an advertising packet. As long as a respective BLE device does not receive an advertising packet, the device remains in a default mode, which is either a scanning mode or an advertising mode. In this way, a controlled switching scheme can be implemented. It can be prevented that both of the at least two BLE devices remain or get stuck in a common mode, such like the scanning mode or the advertising mode.

According to another embodiment, at least one of the first and second BLE devices switches from the advertising mode into the scanning mode after broadcasting an advertising packet.

In this way also a controlled switching behavior of the advertising BLE device can be implemented. Given a situation in which first and second BLE devices are able to communicate via advertising packets in a wireless way the second BLE device is switched from the advertising mode into the scanning mode after broadcasting of the first advertising packet while the first BLE device switches from the scanning mode into the advertising mode and advertises or broadcasts a second advertising packet in response to receive the first advertising packet previously broadcast by the second BLE device. First and second BLE devices have then swapped roles and continue with broadcasting advertising packets and scanning for and receiving respective advertising packets. Since the BLE devices switches between scanning and advertising modes every time an advertising packet has been broadcast and any time an advertising packet has been received or processed the at least two BLE devices are oppositely or alternately switched. One of the two BLE devices is or remains in scanning mode while the other one of the at least two BLE devices is or remains in advertising mode at least for a predefined period of time.

According to a further embodiment, switching between advertising mode and scanning mode is delayed for a predefined time interval after receiving or broadcasting of an advertising packet. Implementing at least a short delay between receiving or broadcasting of an advertising packet and a subsequent or precedent switching of a mode is beneficial in order to assert that one of the at least two BLE devices is in scanning mode before the other one of the at least two BLE devices actually broadcasts or transmits an advertising packet.

According to a further embodiment, the second advertising packet contains an acknowledgement that the first advertising packet has been received and/or processed by the first BLE device. In this way and upon receipt of the second advertising packet the second BLE device receives a feedback that a previously submitted first advertising packet has been safely received and/or processed by the first BLE device. Apart from an acknowledgement or in an alternative embodiment also other generic or situation-dependent information may be included into the second advertising packet.

In this way, the second BLE device may become enabled to modify its further broadcasting and/or packet receiving behavior. It is for instance conceivable that a returning second advertising packet is indicative to the second BLE device to broadcast a modified first advertising packet containing further bits of information or payload to be processed by the first BLE device. Hence, in response to receive and/or to process the first advertising packet the first BLE device may request another or a further, e.g. a modified first or even a third advertising packet from the second BLE device that differs from the first advertising packet.

According to another embodiment, at least one of the first and second advertising packets contains a key indicator that is processed by at least one of first and second BLE devices to stop communicating and to switch into a default mode. The default mode is either the scanning mode or the advertising mode. Per default, the first BLE device may be switched into scanning mode and per default, the second BLE device may be switched into advertising mode. By means of the key indicator the communication between first and second BLE devices can be terminated. The key indicator may be generated and implemented into the first or second advertising packet, depending on the specific type of communication and data transmitting interaction between first and second BLE devices.

According to another embodiment, the second BLE device executes at least one modification action in response to receive the second advertising packet from the first BLE device. In this way and in response to a feedback of the first BLE device, the second BLE device, e.g. acting per default as a peripheral device can be dynamically reconfigured or reprogrammed on behalf of the feedback received from the first BLE device in form of the second advertising packet. In addition or alternatively, the first BLE device may also induce or trigger a different broadcasting behavior of the second BLE device. In response to the feedback from the first BLE device the second BLE device may become subject to a reconfiguration, hence to a reprogramming or similar actions, like over-the air programming.

Following a further embodiment, at least one of the first and second BLE devices switches into a default mode or aborts communication when a predefined idle time has lapsed after broadcasting of a first or second advertising packet without having received a second or first advertising packet in response. In this way, the communication system consisting of at least the first and second BLE devices can be kept intact even if first and second BLE devices are mutually out of reach. Otherwise and in situations wherein a first advertising packet broadcast by the second BLE device cannot be received or processed by the first BLE device, the second BLE device per definition switches into the scanning mode while the first BLE device also remains in scanning mode. If the first BLE device does not respond within the predefined idle time after the first advertising packet has been broadcast by the second BLE device the second BLE device that already switched into the scanning mode returns to the advertising mode. It will then repeatedly submit and broadcast a respective first advertising packet, which, when received by the first BLE device leads to a respective response of the first BLE device in the form of the second advertising packet.

According to another embodiment at least one of first and second BLE devices comprises a single state-machine, which is driven time division multiplexed. Any or all BLE devices involved in a respective wireless communication system may be driven time division multiplexed. During a first time interval, respective BLE devices are driven in scanning mode and in a subsequent time interval respective BLE devices are driven in advertising mode; or vice versa. Implementation of a single state-machine is rather cost efficient and low power consuming. Especially for mobile and battery-driven BLE devices, implementation of such a single state-machine is rather beneficial.

In this way, the state-machine, representing the actual status of the respective BLE device may switch between the advertising mode and the scanning mode.

According to another embodiment, at least one of the first and second BLE devices comprises a multi-state-machine, with at least a first and a second state-machine. There, the first state-machine is activated or is activatable exclusively for the advertising mode and the second state-machine is activated or activatable exclusively for the scanning mode. When not activated, respective state-machines are typically deactivated so that only one of the state-machines is active at any specific time while the other state-machine(s) is/are deactivated.

The overall behavior of the BLE device is then governed by activation or deactivation of first and/or second state-machine without the need of modifying the respective state-machine or configuration of the respective BLE device's hardware or software implementation.

Respective single or multi-state-machines may be implemented purely on the basis on a software implementation, on the basis of a hardware implementation or on the basis of software and hardware particularly adapted for the bi-directional non-connectable undirected advertising communication mode according to the present invention.

In another aspect, the invention equally applies to a computer program to establish wireless communication between at least two Bluetooth Low Energy (BLE) devices. The computer program comprises a programmable means for switching a first BLE device into a scanning mode. The computer program further comprises a programmable means for switching a second BLE device into an advertising mode and for broadcasting a first advertising packet from the second BLE device. The computer program further comprises a programmable means for switching the second BLE device into the scanning mode and further comprises a programmable means for receiving the first advertising packet through the first BLE device. In addition, the computer program comprises a programmable means for switching the first BLE device into the advertising mode and for broadcasting a second advertising packet from the first BLE device, typically in response to receiving and/or processing of the first advertising packet by the first BLE device.

In general, the computer program may equally run on first and second BLE devices. Moreover, the computer program is able and configured to implement the above described method of wireless communication on the basis of at least two Bluetooth Low Energy devices. Consequently, all features, properties and advantages as described in connection with the above mentioned method equally apply to the computer program; and vice versa.

In still another aspect the invention also relates to a wireless communication system comprising at least two Bluetooth Low Energy (BLE) devices. Both BLE devices are alternately switchable between a scanning mode and an advertising mode. A first BLE device is switchable into the scanning mode, in which the first BLE device is able to receive a first advertising packet. In addition, a second BLE device is switchable into an advertising mode, in which the second BLE device is able to broadcast the first advertising packet.

The first BLE device is switchable into the advertising mode after having received the first advertising packet. In said advertising mode the first BLE device is able to broadcast a second advertising packet, typically in response to receiving and/or processing the first advertising packet. The second BLE device is switchable into the scanning mode after having broadcast the first advertising packet. In the scanning mode, the second BLE device is able to receive the second advertising packet. In this way, the second BLE device initially acting as a peripheral device receives feedback from the first BLE device, initially acting as a hub.

After having broadcast and received a first advertising packet, respectively the first and second BLE devices swap roles. The first BLE device initially acting as a hub switches into broadcasting mode and becomes a peripheral device while the second BLE device, initially acting as a peripheral device switches into the scanning mode and operates as a hub.

The wireless communication system is particularly adapted and designed to implement the above described method of wireless communication. Consequently, all features, effects and benefits described in connection with the method equally apply to the communication system, and vice versa.

BRIEF DESCRIPTION OF THE DRAWINGS

In the following, an embodiment of the present invention is described by making reference to the drawings, in which.

DETAILED DESCRIPTION OF EMBODIMENTS OF THE INVENTION

Figure 1:
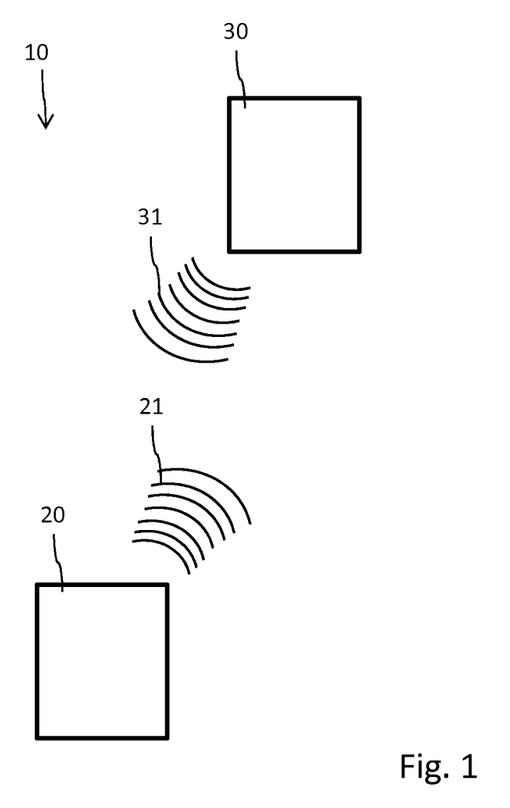
FIG. 1 schematically shows a block diagram of a first and a second BLE device according to the present invention.

In FIG. 1, a wireless communication system 10 is schematically illustrated. The communication system may comprise a plurality of BLE devices 20, 30, alternately acting as peripherals or hubs.

In the illustrated embodiment only two of a plurality of mutually interacting and data exchanging first and second BLE devices 20, 30 are illustrated. In FIG. 1, a first BLE device 20 may initially act as a hub and may per default operate in a scanning mode SM. The second BLE device 30 may per default act as a peripheral and may, per default, switch into an advertising mode AM. In an initial configuration the first BLE device 20 is in scanning mode SM while the second BLE device 30 is in advertising mode AM. In this configuration, it is the second BLE device 30 that broadcasts a first advertising packet 31 which is receivable and processable by the first BLE device 20.

After having broadcast the first advertising packet 31 the second BLE device 30 may switch into the scanning mode SM. In response to receive the first advertising packet 31 from the second BLE device 30 the first BLE device 20 may process the first advertising packet 31. Thereafter or even before processing of the first advertising packet 31 takes place, the first BLE device 20 switches from the scanning mode SM into the advertising mode AM.

Hence, both BLE devices 20, 30 upon broadcasting and/or receiving of the first advertising packet 31 swap or switch roles. In the further procedure of the method, it is then the first BLE device 20 that acts as a peripheral device. Consequently, the first BLE device 20 generates and broadcasts a second advertising packet 21 that is receivable and processable by the second BLE device 30. In this way, the second BLE device 30 initially acting as a peripheral receives feedback from the first BLE device 20, which initially acts as a hub.

The second advertising packet 21 that is typically broadcast in response to the first advertising packet 31 may be indicative to the second BLE device 30 to modify its further or ongoing behavior. By means of the second advertising packet 21, feedback can be provided to the second BLE device 30 to behave and/or to communicate with the first BLE device 20 according to the first BLE device's 20 request.

In this way, the broadcasting behavior of the initial peripheral, i.e. of the first BLE device 20 can be dynamically adapted to the generic or specific requirements or characteristics of the first BLE device 20 without the necessity of establishing a point-to-point communication between first and second BLE devices 20, 30. In this way, neither of first or second BLE devices 20, 30 requires implementation of a complete BLE stack. The hardware and software requirements for implementation of first and second BLE devices 20, 30 can be kept on a rather low, cost- and energy-saving level.

Figure 2:
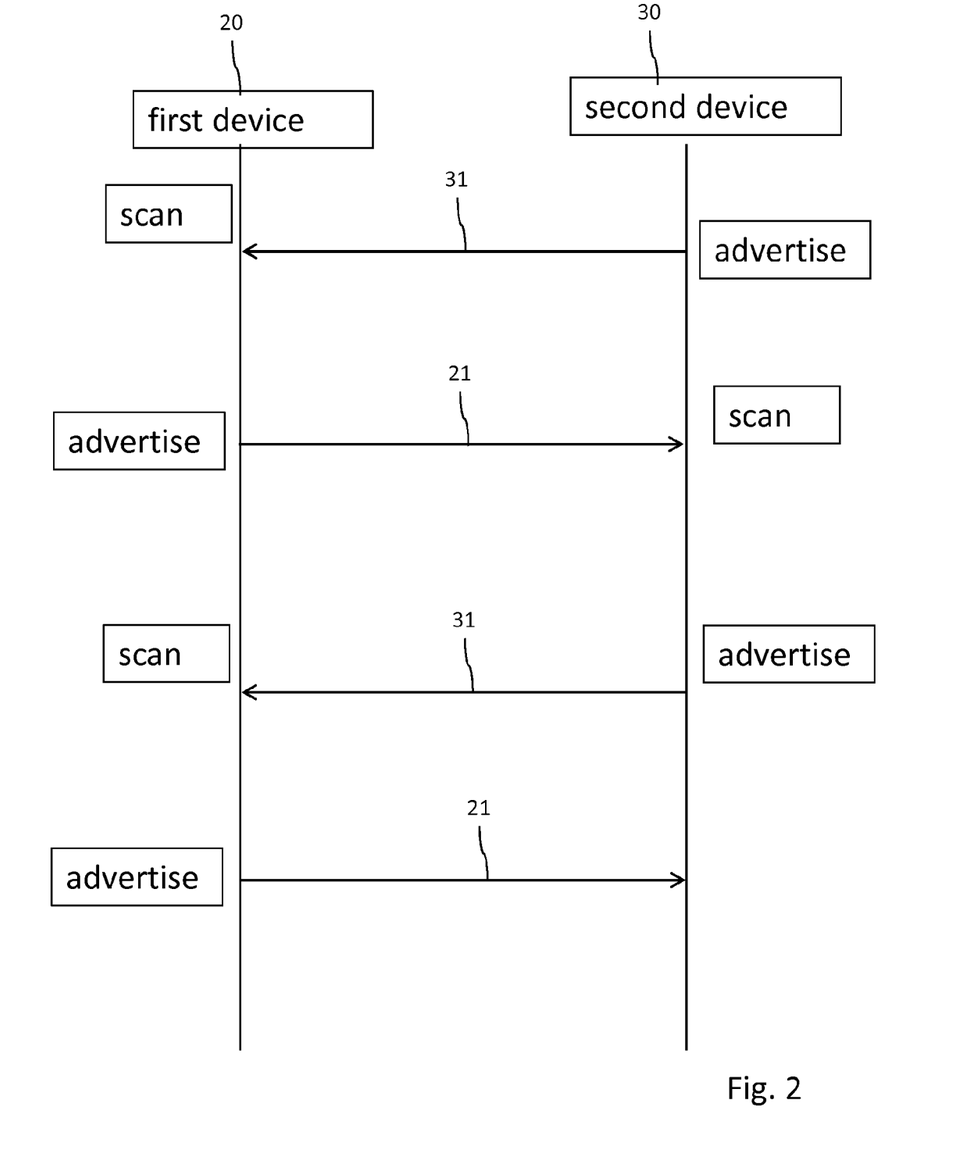
FIG. 2 shows a first flowchart of the behavior of first and second BLE devices for establishing a wireless communication.

In FIG. 2, the alternate scanning and advertising modes of first and second BLE devices 20, 30 is illustrated. Initially, and as illustrated on top of FIG. 2, the first BLE device 20 is in scanning mode and actually scans for packets advertised by the second BLE device 30, which is in advertising mode AM, accordingly. Every time the first BLE device 20 receives an advertising packet 31 from the second BLE device 30 the first BLE device 20 switches from the scanning mode SM into the advertising mode AM. In the same way and after having broadcast a first advertising packet 31 also the second BLE device 30 switches from the advertising mode AM into the scanning mode SM.

After having swapped roles, it is then that the first BLE device 20, which acts as a peripheral and broadcasts a second advertising packet 21, which is accordingly received by the second BLE device 30. Thereafter, the procedure starts from the beginning. The first BLE device 20 is switched back into scanning mode SM and the second BLE device 30 is switched back into the advertising mode. The illustrated procedure continues until one of the first and/or second BLE devices 20, 30 generates a respective advertising packet 21, 31 that contains a key indicator indicating termination or end of a communication. A key indicator is interpreted in scanning mode SM of first and/or second BLE devices 20, 30 to stop communication and to return into a default mode.

Figure 3:
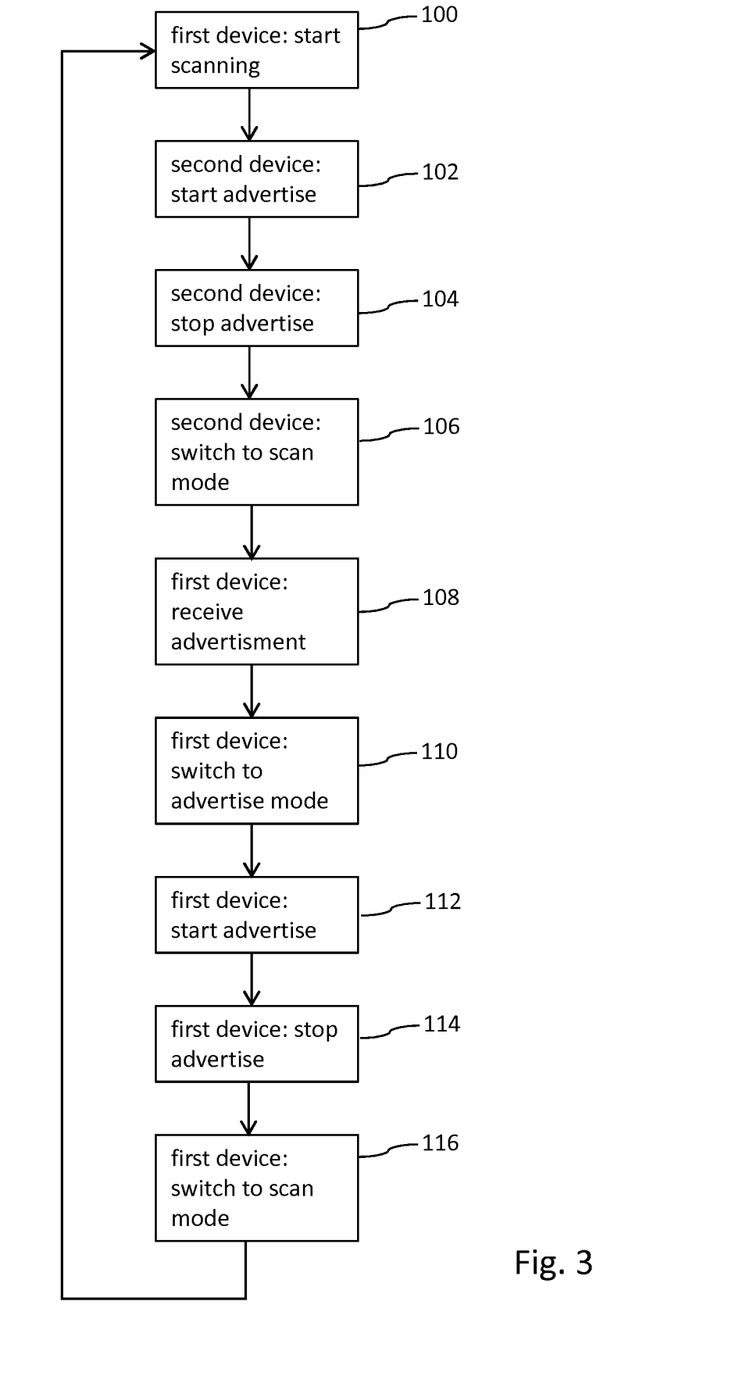
FIG. 3 shows a further flowchart of the method of wireless communication.

In the flowchart of FIG. 3, a sequence of switching, broadcasting and receiving steps is schematically illustrated. In a first step 100 the first, or local, device 20 is switched or has been switched into scanning mode SM. The respective device starts scanning. Thereafter, or simultaneously with the scanning of the first device 20 in step 102, a second, or remote, BLE device 30 starts advertising. Consequently, the second device 30 is already in a respective advertising mode. After having broadcast (e.g. a first advertising packet) the second device 30 immediately stops advertising in step 104 and switches into the scanning mode SM in a subsequent step 106. In step 108 the local, or first, BLE device 20 receives the first advertising packet previously broadcast by the second device in step 102.

In response to receiving the first advertising packet, the local, or first, BLE device 20 switches in step 110 into an advertising mode AM. Thereafter, or concurrently with the switching into advertising mode, the first BLE device typically processes the received first advertising packet and starts advertising itself a second advertising packet in step 112. After broadcasting the second advertising packet in step 112, the first BLE device 20 stops advertising in step 114 and switches back into the scanning mode SM in a subsequent step 116. In the meantime, simultaneously, previously or thereafter, the second BLE device 30 receives the second advertising packet and generates again a first advertising packed to be received by the first BLE device 20 when in scanning mode SM. In other words, the procedure jumps back to step 100 so that the loop of steps 100-116 is executed repeatedly. The loop of steps 100-116 continues until at least one of first and second BLE devices 20, 30 receives a key indicator that is processed to stop or to abort communication between first and second BLE devices.

Figure 4:
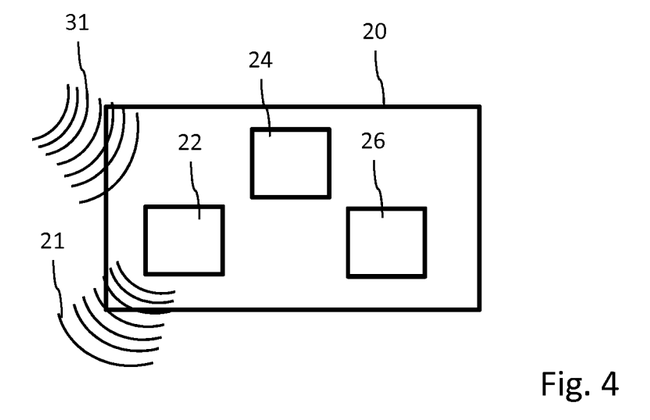
FIG. 4 is illustrative of a single state-machine implementation of a BLE device.

In FIG. 4, a rather simple block diagram of a first embodiment of a first BLE device 20 is illustrated. The BLE device 20 is implemented as a single state-machine. It comprises a transceiver 22, a processor 24 as well as a storage element 26. The processor 24 acts as a single state-machine controller and drives the transceiver 22 in a time multiplexed scheme. The processor 24 actually switches the BLE device 20 between a scanning mode SM, in which the transceiver actually behaves like an antenna to receive advertising packets 31 broadcast by a different BLE device 30. When switched in advertising mode AM, the transceiver 22 is able to broadcast a second advertising packet 21 that is to be received and processed by some other BLE device 30.

Figure 5:
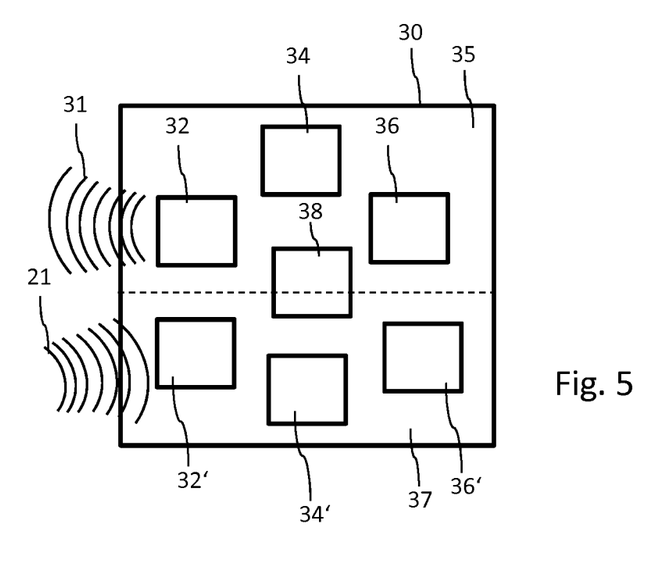
FIG. 5 is indicative of a multi-state-machine of a BLE device.

In FIG. 5, a different implementation of a BLE device 30 is illustrated. This BLE device 30 is comprised of two different state-machines 35, 37. Both state-machines 35, 37 comprise or represent different states or modes of the BLE device 30. The BLE device 30 generally has a transceiver 32, a processor 34 as well as a storage element 36. The two state-machines 35, 37 are represented by substantially identical components. In comparison to the state-machine 35, state-machine 37 is comprised of a transceiver 32', a processor 34' and a storage element 36'. Here, transceiver 32', processor 34' and storage 36' just represent different states or different configurations of transceiver 32, processor 34 and/or storage 36.

As illustrated in FIG. 5, the two transceivers 32, 32' of the two different state-machines 35, 37 persistently act either as a signal-receiving entity or as a signal-broadcasting entity. The transceiver 32 is able to broadcast first advertising packets 31 while the transceiver 32' is able to receive second advertising packets 21 from different BLE devices 20. The two state-machines 35, 37 are alternately and oppositely activated or deactivated so that only one of the two state-machines 35, 37 is active at any given time. The switching between first and second state-machines 35, 37 is controllable by a respective state-machine controller 38.

In general, the method of wireless communication and the wireless communication system can be based on and already provided with rather simple, low cost and low power consumption hardware components. Power consumption of respective BLE devices 20, 30 can therefore be effectively reduced.

The invention claimed is:

1. A method of wireless communication between at least two Bluetooth Low Energy (BLE) devices, comprising the steps of:
   switching a first BLE device into a scanning mode,
   switching a second BLE device into a non-connectable undirected advertising mode, and broadcasting a first non-connectable undirected advertising packet from the second BLE device,
   receiving the first non-connectable undirected advertising packet by the first BLE device,
   switching the second BLE device into the scanning mode,
   switching the first BLE device into the non-connectable undirected advertising mode, and broadcasting a second non-connectable undirected advertising packet from the first BLE device.

2. The method according to claim 1, wherein at least one of the first and second BLE devices switches from the scanning mode into the non-connectable undirected advertising mode in response to receiving a non-connectable undirected advertising packet.

3. The method according to claim 1, wherein at least one of the first and second BLE devices switches from the non-connectable undirected advertising mode into the scanning mode after broadcasting an advertising packet.

4. The method according to claim 2, wherein switching between the non-connectable undirected advertising mode and the scanning mode is delayed for a predefined time interval after receiving or broadcasting of a non-connectable undirected advertising packet.

5. The method according to claim 1, wherein the second non-connectable undirected advertising packet contains an acknowledgement that the first non-connectable undirected advertising packet has been received and/or processed by the first BLE device.

6. The method according to claim 1, wherein at least one of the first and second non-connectable undirected advertising packets contains a key indicator that is processed by at least one of first and second BLE devices to stop communicating and to switch into a default mode, which is either the scanning mode or the non-connectable undirected advertising mode.

7. The method according to claim 1, wherein the second BLE device executes at least one modification action in response to receiving the second non-connectable undirected advertising packet from the first BLE device.

8. The method according to claim 1, wherein at least one of the first and second BLE devices switches into a default mode or aborts communication when a predefined idle time has lapsed after broadcasting a first or second non-connectable undirected advertising packet without having received a second or first non-connectable undirected advertising packet in response.

9. The method according to claim 1, wherein at least one of the first and second BLE devices is comprised of a single state-machine which is driven time division multiplexed.

10. The method according to claim 1, wherein at least one of the first and second BLE devices is comprised of a multi-state-machine with at least a first and a second state-machine, wherein the first state machine is activated for the non-connectable undirected advertising mode and wherein the second state-machine is activated for the scanning mode, or vice versa.

11. A non-transitory computer readable medium storing a computer program to establish wireless communication between at least two Bluetooth Low Energy (BLE) devices, the computer program comprising:
    program means for switching a first BLE device into a scanning mode,
    program means for switching a second BLE device into a non-connectable undirected advertising mode and for broadcasting a first non-connectable undirected advertising packet from the second BLE device,
    program means for switching the second BLE device into the scanning mode,
    program means for receiving the first non-connectable undirected advertising packet through the first BLE device, and
    program means for switching the first BLE device into the non-connectable undirected advertising mode and for broadcasting a second non-connectable undirected advertising packet from the first BLE device.

12. A wireless communication system comprising at least two Bluetooth Low Energy (BLE) devices that are both switchable between a scanning mode and a non-connectable undirected advertising mode,
    wherein a first BLE device comprises a first switching device configured to switch the first BLE device into the scanning mode, in which the first BLE device is able to receive a first non-connectable undirected advertising packet,
    wherein a second BLE device comprises a second switching device configured to switch the second BLE device into the non-connectable undirected advertising mode, in which the second BLE device is able to broadcast the first non-connectable undirected advertising packet,
    wherein the first switching device is further configured to switch the first BLE device into the non-connectable undirected advertising mode (AM) after the first BLE device receives the first advertising packet, in which the first BLE device is able to broadcast a second non-connectable undirected advertising packet, and wherein the second switching device is further configured to switch the second BLE device onto the scanning mode after the second BLE device broadcasts the first non-connectable undirected advertising packet, in which when in the scanning mode the second BLE device is able to receive
    the second non-connectable undirected advertising packet.

* * * * *